Dec. 22, 1953     D. A. ARMSTRONG ET AL     2,663,277
OUTBOARD MOTOR WITH REVERSING MECHANISM AND CONTROL
Filed Sept. 16, 1949     7 Sheets-Sheet 7
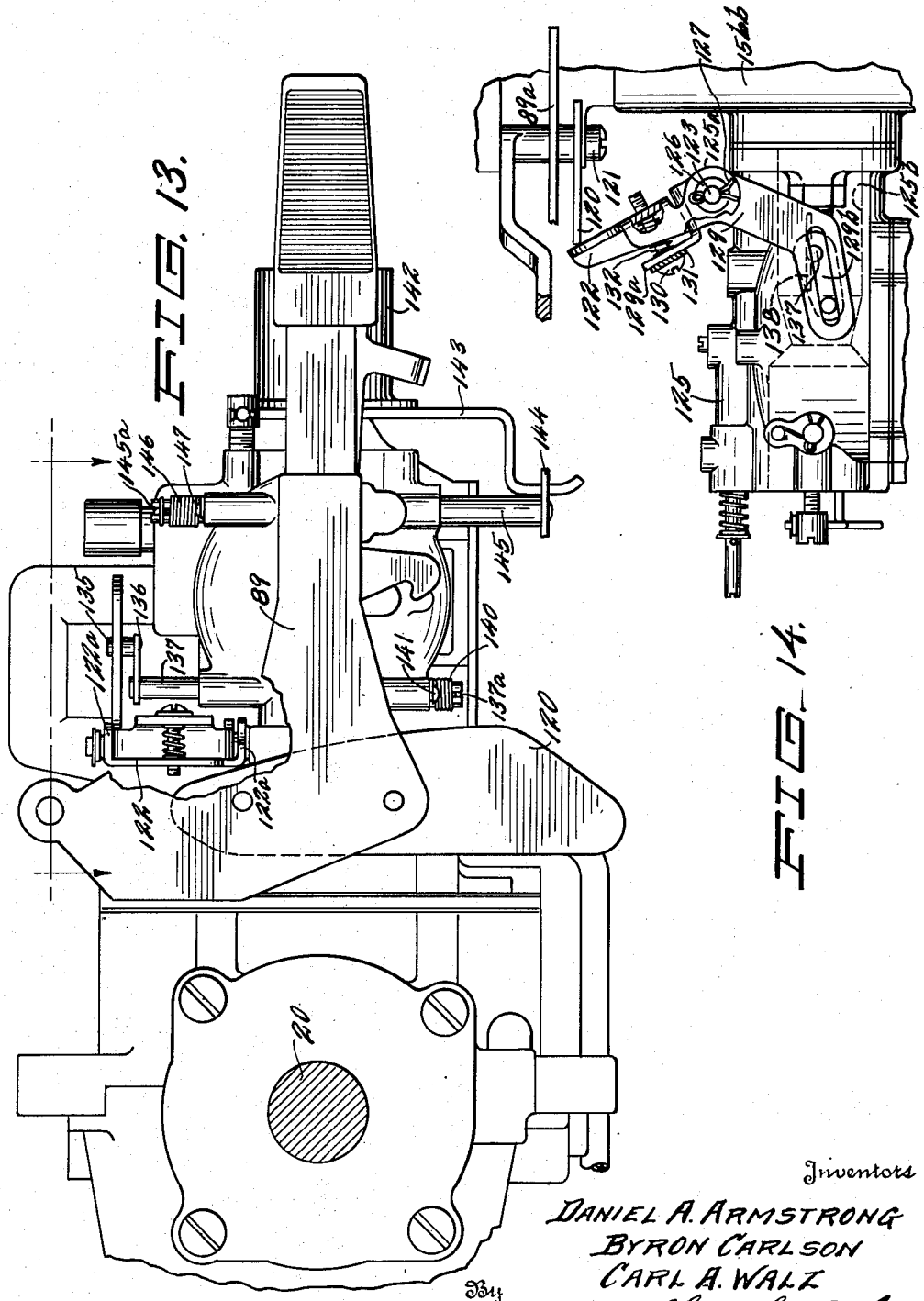
Inventors
DANIEL A. ARMSTRONG
BYRON CARLSON
CARL A. WALZ
Chas. E. Reif
ATTORNEY.

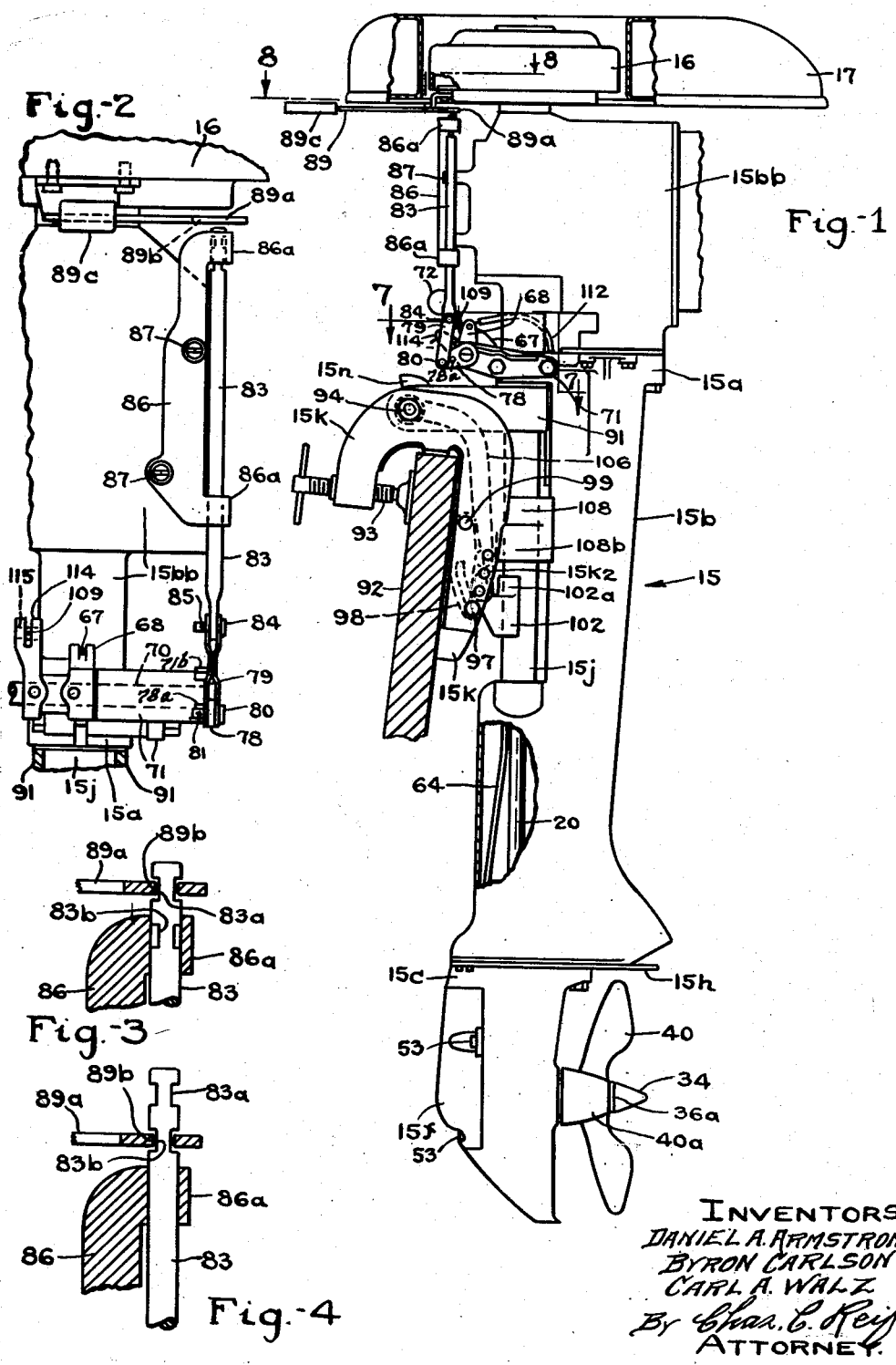

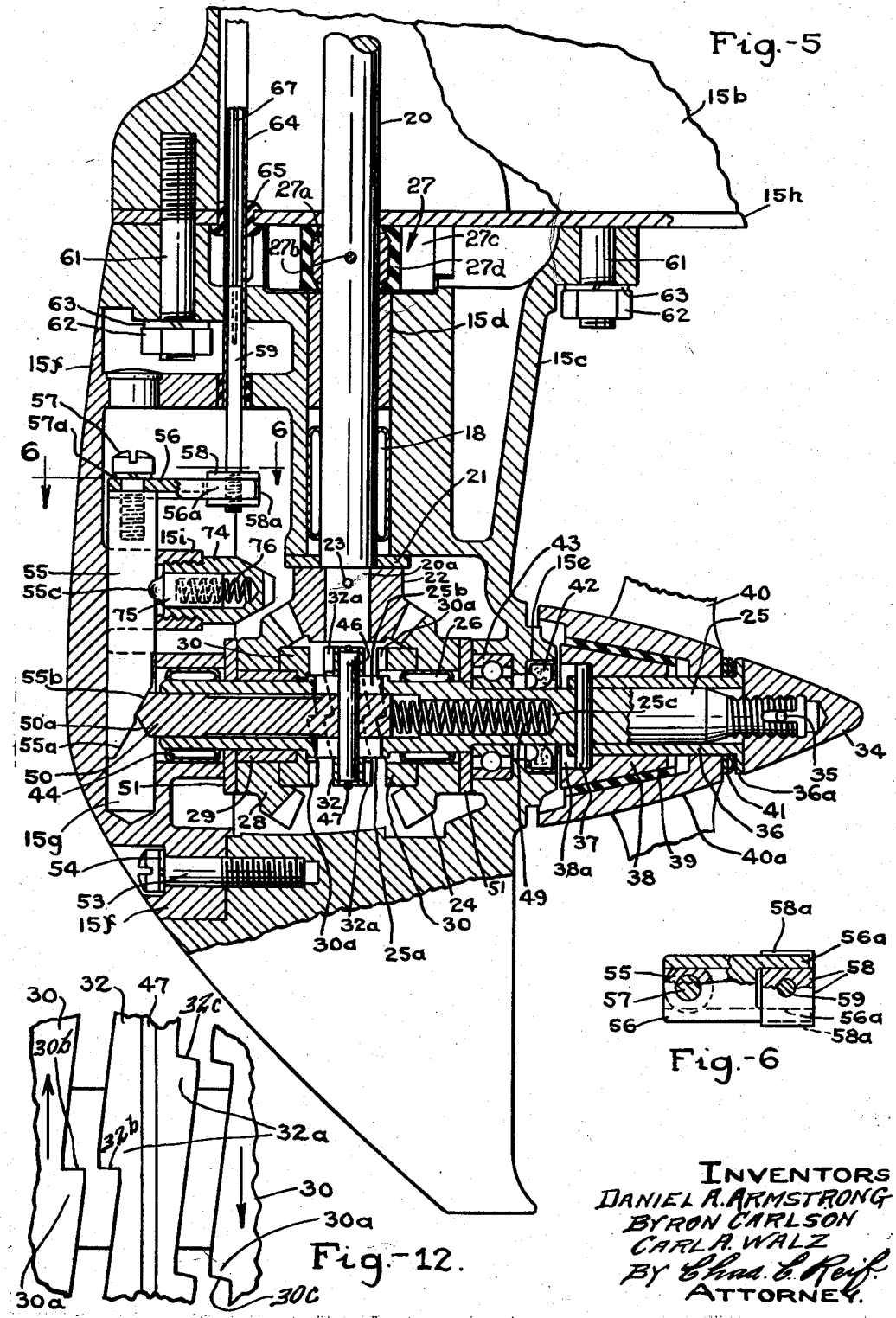

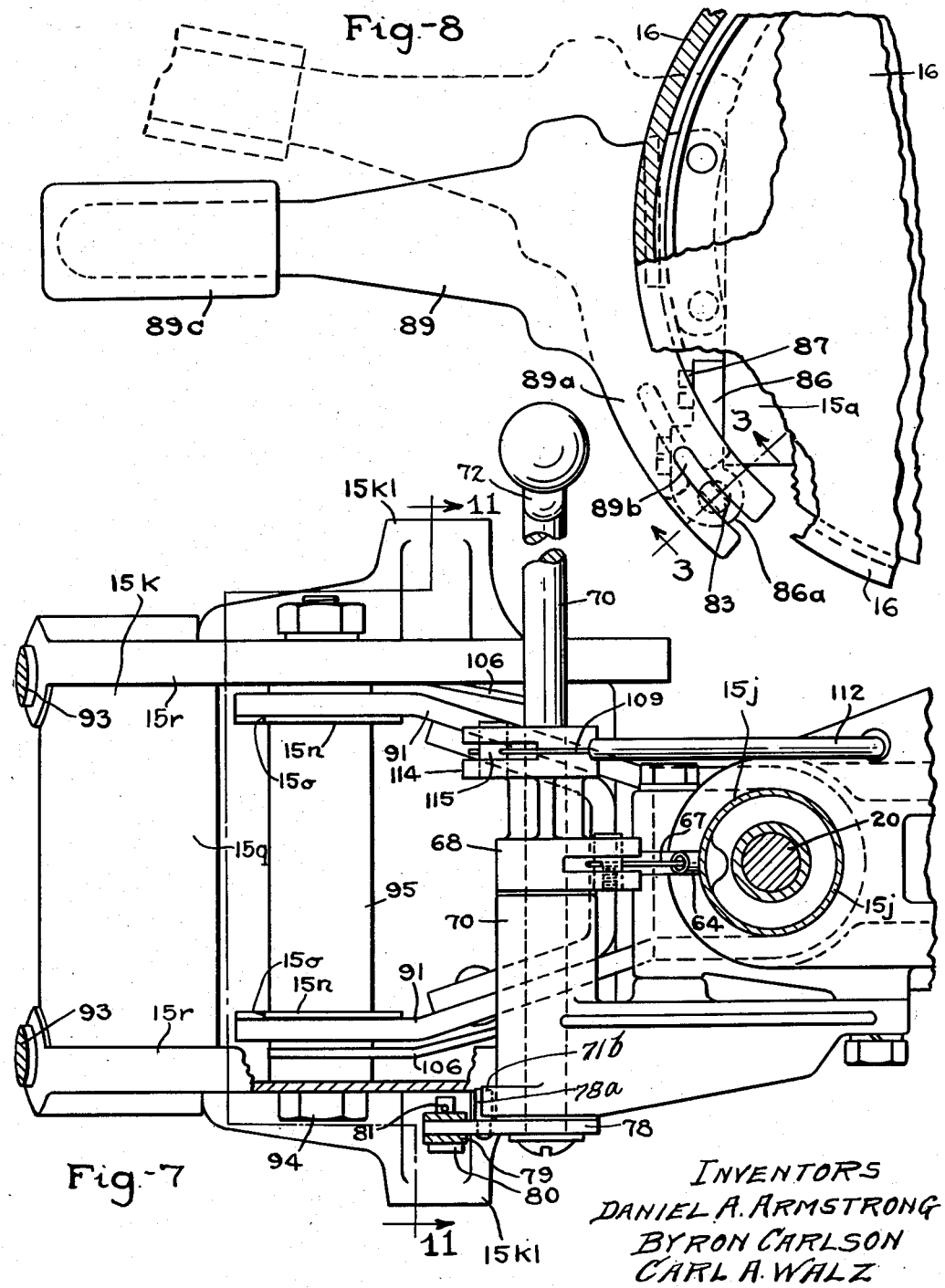

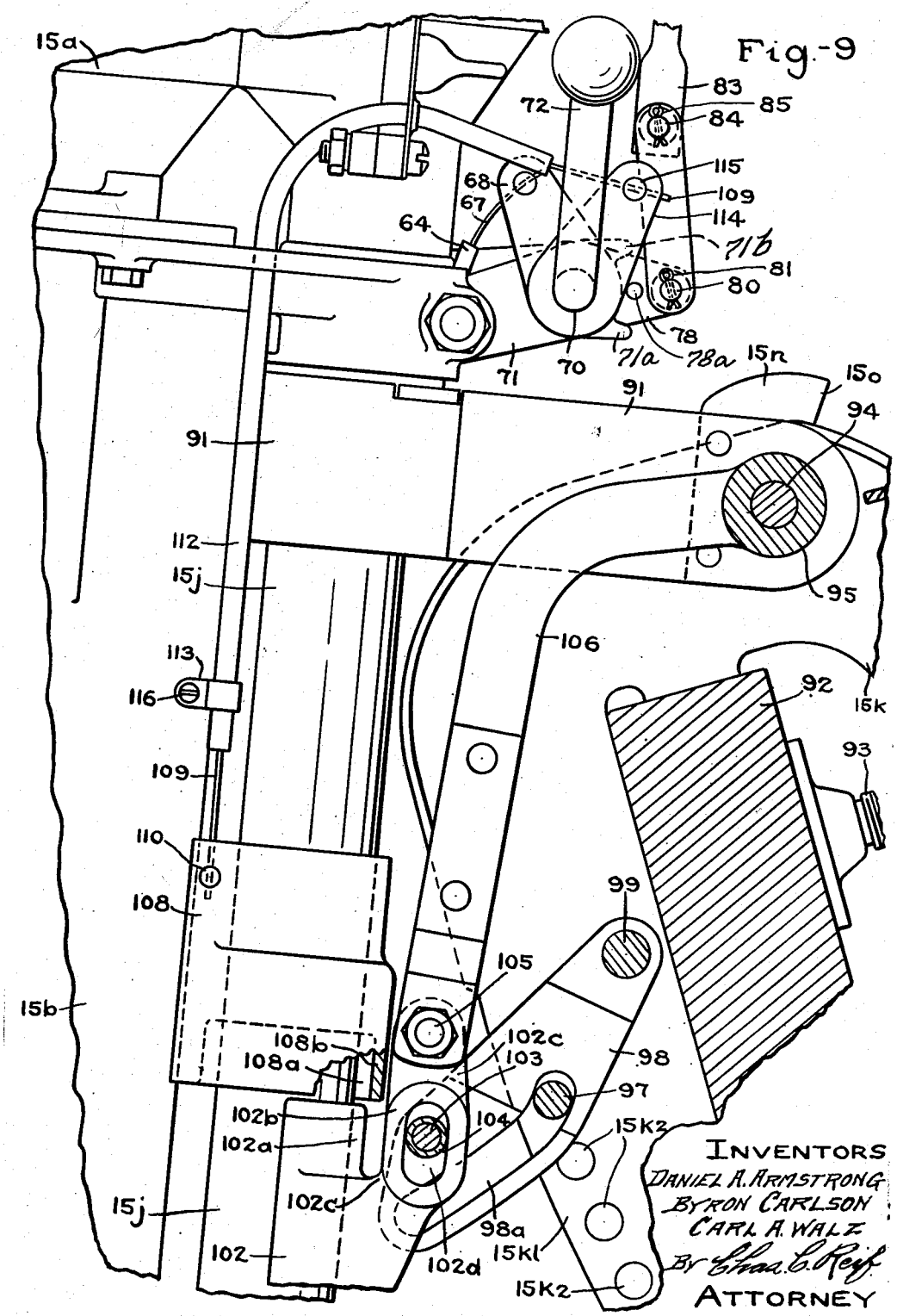

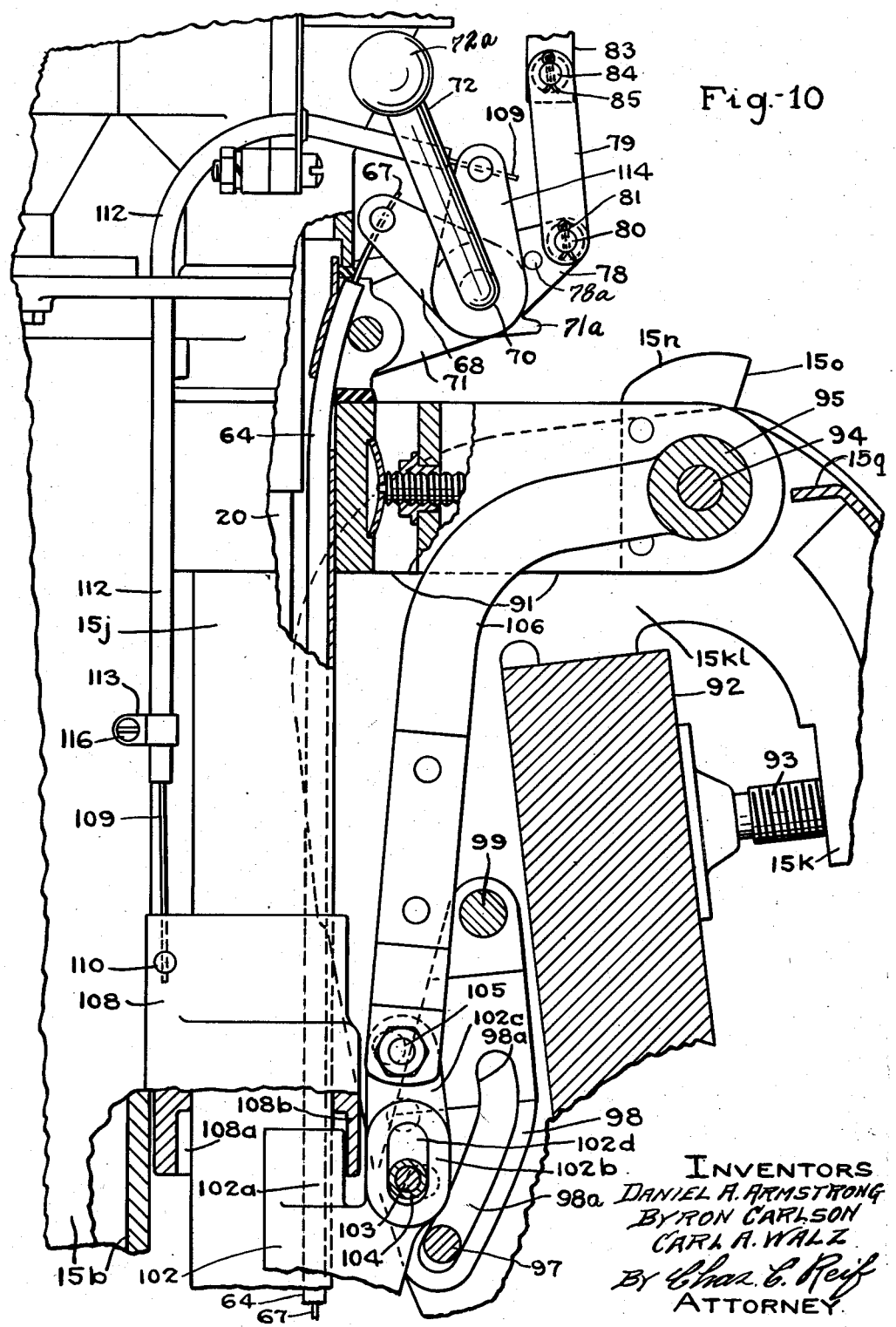

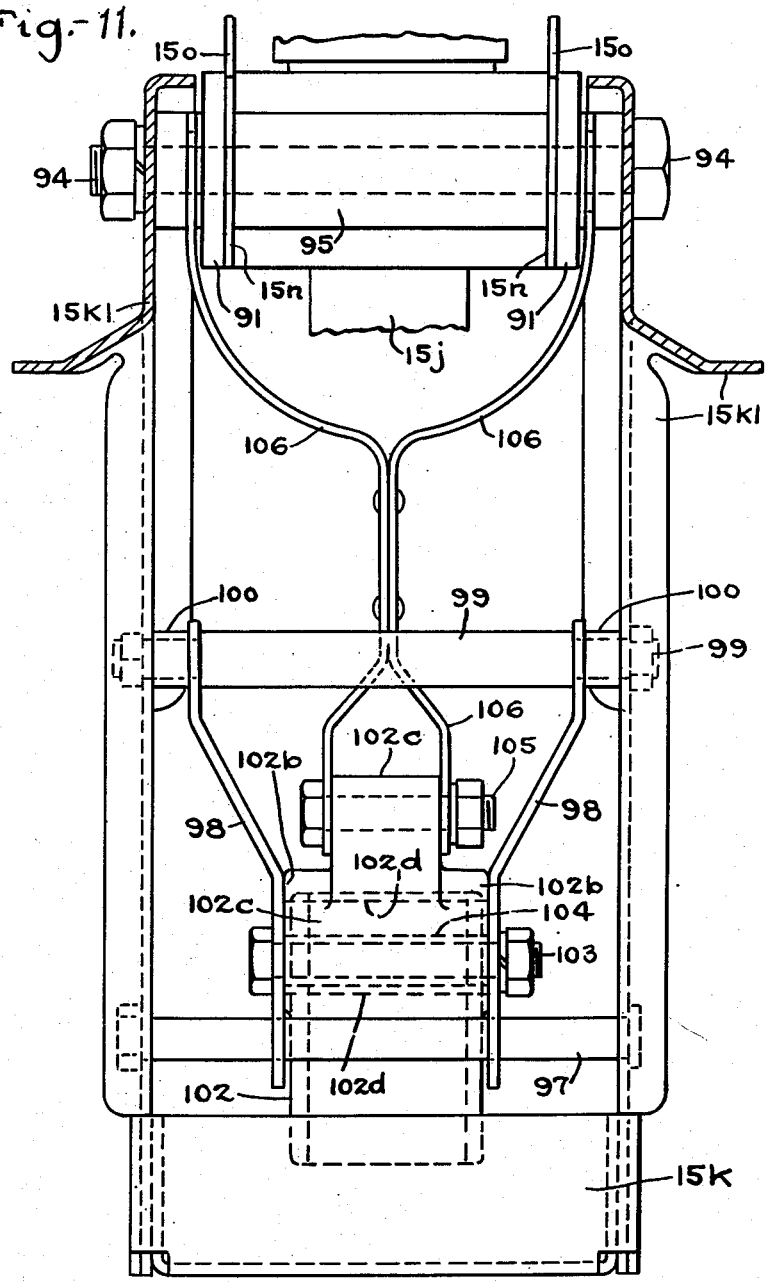

Patented Dec. 22, 1953

2,663,277

UNITED STATES PATENT OFFICE 2,663,277

OUTBOARD MOTOR WITH REVERSING MECHANISM AND CONTROL

Daniel A. Armstrong, Byron Carlson, and Carl A. Walz, Minneapolis, Minn., assignors to Scott-Atwater Manufacturing Co. Inc., Minneapolis, Minn., a corporation of Minnesota Application September 16, 1949, Serial No. 116,131

15 Claims. (Cl. 115—18)

1

This invention relates to an outboard motor. Outboard motors as previously made have generally used a two cycle motor and the driving mechanism for the propeller has been constructed to drive the propeller in only one direction. It has long been recognized that it would be desirable to have a reversing mechanism in the driving structure so that the propeller and propeller shaft could be placed in neutral or inoperative position with the motor running and so that the propeller and propeller shaft could be readily placed in forward or reverse positions.

It is an object of this invention to provide an outboard motor comprising a simple and efficient and readily operable reversing mechanism for the propeller.

It is a further object of the invention to provide an outboard motor having a reversing mechanism for the propeller, said mechanism being movable to forward, neutral and reverse positions, together with a control means which will prevent shifting from neutral and reverse positions with the motor running at high speed.

It is another object of the invention to provide an outboard motor comprising a reversing mechanism for the propeller movable to forward, neutral and reverse positions, a member located for convenient manipulation by the operator for shifting said mechanism, and means moved by said member which will prevent said member being moved to shift said mechanism from neutral and reverse positions until the speed of the motor is materially reduced.

It is still further an object of the invention to provide an outboard motor having a reversing mechanism for the propeller shiftable to forward, neutral and reverse positions, said motor having spark adjusting means movable to increase the speed of said motor, together with a control means cooperating with said spark adjusting means to prevent shifting of said mechanism from neutral or reverse positions until said spark adjusting means is in position giving a comparatively low speed to said motor.

It is also an object of this invention to provide an outboard motor comprising reversing mechanism shiftable to forward, neutral and reverse positions, a member adapted to be manipulated by the operator for shifting said mechanism, a second member movable by said member and a spark adjusting means comprising a movable element cooperating with said second member to prevent movement of said first mentioned member to shift said mechanism from neutral or reverse positions unless said spark

2 adjusting means is in position giving a comparatively low speed to said motor.

It is also another object of this invention to provide an outboard motor having a casing, means pivoted to said casing about a substantially horizontal axis and adapted to be clamped to a boat so that said casing and parts below the pivot of said casing may swing outwardly and upwardly away from said boat, a reversing mechanism for the propeller of said motor movable to forward, neutral and reverse positions, together with means for preventing said swinging movement when said mechanism is moved to reverse position.

These and other objects and advantages of the invention will be fully set forth in the following description made in connection with the accompanying drawings in which like reference characters refer to similar parts throughout the several views and in which:

Fig. 1 is a view in side elevation of an outboard motor embodying the present invention, some parts being broken away and others shown in vertical section;

Fig. 2 is a partial view in side elevation of the structure shown in Fig. 1, as seen from the left thereof;

Fig. 3 is a vertical section taken substantially on line 3—3 of Fig. 8, as indicated by the arrows;

Fig. 4 is a view similar to Fig. 3 showing the parts in a different position;

Fig. 5 is a view in vertical section of the lower part of said motor taken through the axis of the propeller shaft;

Fig. 6 is a horizontal section taken substantially on line 6—6 of Fig. 5, as indicated by the arrows;

Fig. 7 is a partial horizontal section taken substantially on line 7—7 of Fig. 1, as indicated by the arrows;

Fig. 8 is a partial view in horizontal section taken substantially on line 8—8 of Fig. 1, as indicated by the arrows some parts being broken away;

Fig. 9 is a partial view in side elevation of the intermediate part of said motor, some parts being broken away and others shown in vertical section;

Fig. 10 is a view similar to Fig. 9 with some of the parts in different positions;

Fig. 11 is a rear sectional view taken substantially on line 11—11 of Fig. 7, the section through the driveshaft 20 and driveshaft housing 15 being on a lower plane. The knob on handle lever 72 which is above the line 7—7 is also shown;

Fig. 12 is a partial view in side elevation showing the specific construction of clutch members used;

Fig. 13 is a plan view of the spark adjusting lever and attached parts, the driveshaft being shown in horizontal section and portion 89a omitted; and Fig. 14 is a view in side elevation of some of the parts shown in Fig. 13.

Referring to the drawings, an outboard motor is shown comprising a casing 15 having an upper portion 15a carrying the motor proper, an intermediate driveshaft housing 15b and a propeller shaft housing 15c. The flywheel 16 is shown above portion 15b of said casing and the gas tank 17 is shown surrounding the flywheel 16. See Fig. 1. A driveshaft 20 extends downwardly in casing portion 15a and is journaled adjacent its lower end in a bushing 15d and in a needle bearing 18 in the propeller shaft housing 15c. Driveshaft 20 extends through a pump casing 19 in which is disposed a pump 27 having a hub 27a secured in any suitable manner, as by the key or the pin 27b, to shaft 20. Pump 27 has a plurality of radial vanes 27c connected to the hub portion 27d, which with the vanes is made of yielding material, such as rubber or rubber composition. Pump casing 19 will have the usual inlet and outlet openings. Shaft 20 extends through a plate or washer 21 and has a reduced portion 20a to which is secured a beveled gear 22. Gear 22 can be secured in any suitable manner, as by a pin 23 extending therethrough and through shaft portion 20a. Shaft portion 20a forms the lower end of shaft 20. Another beveled gear 24 is disposed so as to constantly mesh with gear 22. Gear 24 is journaled on a propeller shaft 25 and needle bearings 26 are disposed between gear 24 and said shaft 25. Another beveled gear 28 is disposed to be constantly in mesh with gear 22 and is disposed at the opposite side of said gear from beveled gear 24. Beveled gear 28 is journaled on propeller shaft 25 and a bushing 29 is disposed between said gear 28 and said shaft. Beveled gears 24 and 28 carry or have secured to their adjacent faces clutch members 30. Members 30 can be secured to gears 24 and 28 in any suitable manner. Clutch members 30 have clutch teeth 30a on their adjacent faces. These clutch teeth have surfaces 30b on the clutch secured to gear 28 which are in planes parallel to the axis of gear 28. The clutch teeth on gear 24 have surfaces 30c which are in a plane making a slight angle to the axis of gear 24. (See Fig. 12.) A clutch member 32 is provided and the same is slidable on an enlarged portion 25a of propeller shaft 25, said clutch member 32 having clutch teeth 32a on its opposite sides adapted respectively to mesh with the clutch teeth 30a on the members 30. The clutch teeth 32a cooperating with the teeth on gear 28 have surfaces 32b in planes parallel to the axis of member 32, while the teeth 32a cooperating with the teeth on gear 24 have surfaces 32c disposed in planes at a slight angle to said axis. Propeller shaft 25 is threaded at one end, on which end is screwed a terminal cap 34, the same being pinned to shaft 25 by a pin 35. A sleeve 36 is secured to shaft 25 by a transversely extending pin 37, which pin is disposed in a recess 38a of a friction cone 38 extending about sleeve 36. A conical sleeve 39 of friction material fits about cone 38 and also fits in a conical recess in the hub 40a of the propeller 40. Washers 41 are disposed between the outer end of the propeller hub 40a and the flange 36a at the outer end of sleeve 36. The propeller shaft housing 15c has a hub at its rear end surrounding propeller shaft 25, said hub having a recess 15e therein in which is disposed a sealing washer 42. Propeller shaft 25 is journaled on a ball bearing 43 disposed in the propeller shaft housing 15c and is also journaled on a needle bearing 44 disposed in said propeller shaft housing. Portion 25a of propeller shaft 25 has a transverse slot 25b extending diametrically therethrough. A pin 46 extends through slot 25b and fits in clutch member 32 at each side of shaft portion 25a. A retainer spring ring 47 is disposed in clutch member 32 at the ends of pin 46 and prevents endwise movement of the latter. Propeller shaft 25 is provided with an axial bore 25c in which is disposed a compression coiled spring 49. Spring 49 bears at one end against the end of bore or recess 25c and at its other end against a member or shaft 50 fitting in an axial bore in the propeller shaft 25. Pin 46 extends through and fits in shaft 50. Washers 51 are disposed at the remote ends of gears 24 and 28, the same substantially fitting on propeller shaft 25 and abutting hubs in propeller shaft housing 15c. Shaft 50 is beveled at its end opposite spring 49, as shown at 50a.

Propeller shaft housing 15c comprises a portion 15f secured by bolts 53, said bolts being shown as having spring washers 54 beneath the heads thereof. Portion 15f is bored to form a recess 15g in which is slidably fitted a rod 55. Rod 55 has two beveled portions 55a and 55b adjacent its lower end adapted respectively to engage the beveled end of shaft 50. Rod 55 has engaging its upper end and connected thereto a member or plate 56 by a headed screw 57, said screw being shown as having a spring washer 57a under the head thereof. Member 56 has spaced portions 56a at its end remote from screw 57 and these are disposed in slots 58a formed in the sides of a member 58. A rod 59 is connected to member 58 by having its lower end threaded into the same. It may be stated that propeller shaft housing 15c is connected to the driveshaft housing 15b by threaded studs 61 equipped at their lower ends with nuts 62 and spring washer 63. A plate 15h is disposed between housings 15b and 15c. A tube 64 is disposed in the upper end of propeller shaft housing 15c and in which rod 59 is slidable. Said tube 64 is shown as being rubber sealed in plate 15h at 65. A flexible wire or small rod 67 is secured to rod 59 and extends upwardly through tube 64. Tube 64 extends upwardly through casing 15, as shown in Figs. 1, 7 and 10, and is secured at its upper end adjacent the outer end of an arm 68 by a swiveling stud 66. Arm 68 is secured to a shaft 70 journaled in a bracket 71 secured to a boss at one side of driveshaft housing 15b. A shift operating lever 72 is secured to or formed integrally with shaft 70 at one end of bracket 71, which lever has an end knob 72a. It will be seen that when lever 72 is oscillated, arm 68 will be oscillated and wire 67 will be pushed downwardly or pulled upwardly in tube 64, thus moving rod 55 downwardly or upwardly. Wire 67 due to its being flexible accommodates itself to the curvature of tube 64. Stop lugs 71a and 71b on bracket 71 are respectively engageable by a pin 76a carried in an arm 76 when lever 72 is moved to the forward or reverse positions. A member 74 of general cylindrical form has a reduced threaded end portion threaded into a boss 15i. Member 74 is bored to receive a plug or plunger 75, one end of which is engaged by a compression coiled spring 76 having its other end engaging the end of the recess in member 74. Plunger 75 is thus urged toward rod 55 and said rod has a recess 55c in one side thereof in which the reduced rounded end of plunger 75 seats when rod 55 is in the position shown in Fig. 5.

Arm 78 is secured to shaft 70 to which a link 79 is pivoted by a headed stud 80. See Figs. 1, 7, 9 and 10. Link 79 is shown as bifurcated at its ends and the same embraces the end of arm 78. Stud 80 is held in position by a cotter pin 81. The upper end of link 79 embraces the flattened lower end of a rod 83 to which it is pivoted by the headed stud 84 held in place by a cotter pin 85. Rod 83 fits in and is slidable in the bores in the ends 86a of a bracket 86 secured to housing portion 15bb by headed screws 87. The upper end of rod 83 is provided with vertically spaced reduced portions 83a and 83b. The motor is provided with a spark adjusting means including a lever 89 having a handle portion 89c. Lever 89 is oscillatable about the axis of driveshaft 29. As is well known, the movement of lever 89 in one position advances the spark and increases the speed of the motor and movement thereof in the opposite direction, retards the spark and decreases the speed of the motor. Said lever 89 forms the ordinary and common means for regulating the speed of the motor. Lever 89 is provided with an extension plate 89a which is provided with an arcuate slot 89b concentric with the fulcrum axis of lever 89. See Fig. 8. It will be noted that the axis of rod 83 intersects the center line of slot 89b, as shown in Fig. 8. When rod 83 is in the position shown in Figs. 3 and 4, lever 89 and the extension plate 89a can be moved until portions 83a or 83b reach the inner end of slot 89b. At such times the slot 89b will embrace the reduced portion 83a or 83b, as shown in Figs. 3 and 4. At other times the rod 83 will prevent the movement of lever 89 and extension plate 89a to certain positions. It will be seen that the portion of plate 89a in the rear of slot 89b can move over the top of rod 83. Rod 83 then of course could not be moved upwardly as it would strike said plate.

Referring to Figs. 13 and 14, the spark adjusting lever 89 is shown with its handle 89c. Said lever in addition to plate 89a, which is not shown in Fig. 13, has secured thereto a plate cam 120 which is held by the headed screws 121. Cam 120 is arranged to engage the upper end of a lever arm 122 which has ear forming portions 122a pivoted on a stud 123. Stud 123 is secured in a lug 125a of the carburetor casing 125. Member 122 is held in place on said stud by a washer 126 and a cotter pin 127. Another lever arm 129 is also pivoted on stud 123 and has an offset portion 129a which extends substantially parallel to the intermediate portion 122b of member 122. A headed screw 130 extends through portion 129a and is threaded into portion 122b, the same having a washer 131 underlying the head thereof. A compression coiled spring 132 surrounds screw 130 between portions 129a and 122b. Lever arm 129 extends downwardly at one side of the carburetor casing 125 and has a portion extending at an angle thereto in which is formed an elongated slot 129b. A pin 135 secured to and extending at right angles to an arm 136 is disposed in slot 129b and secured to a shaft 137 which extends into the carburetor casing 125 and has secured thereto a plate valve 138 which is adapted to open and close the passage 125b in the carburetor through which the combustible mixture passes to the motor or cylinder head 15bb. Shaft 137 is surrounded at one end by a torsion coiled spring 140 one end of which is held in a slot 137a of said shaft, the other end of which is secured to a portion of casing 125 by its groove 141. A cylindrical drum-like handle member 142 is shown in Fig. 13 constituting a choke member and also having connected thereto an arm 143 adapted to engage an arm 144 on a shaft 145 for controlling the air inlet valve of the carburetor. Shaft 145 is also urged to rotate in one direction by a torsion coiled spring 146 surrounding the same and having one end secured in a slot 145a in one end of said shaft and having its other end secured to casing 125 by a screw 147.

The motor as usual has a portion 15k adapted to be clamped to a boat transom 92 by a pair of laterally spaced screw clamps 93. This comprises laterally spaced portions or arms 15k1. The casing 15 is pivoted to portion 15k by the headed and nutted bolt 94. As shown in Figs. 1 and 7, arms 91 embrace the driveshaft housing 15j and extend in diverging relation from said driveshaft casing 15j and the bolt 94 passes through arms 91 and through portions 15k1. A sleeve 95 is disposed between the arms 91. The casing 15 is ordinarily swingable about the axis of bolt 94 and the lower portion thereof can thus swing outwardly and upwardly usually to a substantially horizontal position. A pair of laterally spaced plates 15n are secured to and project above arms 91 and have edges 15o which form a stop to limit relative swinging movement of part 15k and the rest of the motor. Edges 15o engage a flange 15q disposed between the spaced side portions 15r of portion 15k. The casing 15 swings toward member or bracket 15k and its position is determined by the location of a headed pin 97 extending between the laterally spaced portions of member 15k. Portions 15k1 are provided with a plurality of spaced holes 15k2 in any one of which pin 97 may be disposed. In the present construction, pin 97 passes through or is disposed in slots 98a formed in a pair of spaced plates 98 pivotally mounted on a bolt or pin 99 extending between and secured to portions 15k1. Pin 99 has reduced end portions surrounded by spacers 100 between members 98 and portions 15k1. See Fig. 11. A member 102 Figs. 10 and 11 has a cylindrical recess in one side receiving or embracing the driveshaft casing 15j. Member 102 has an upper portion 102a substantially semi-cylindrical in form and of rather small thickness. Member 102 has an upwardly extending portion 102c with laterally projecting bosses 102b which are provided with an elongated slot 102d. A headed and nutted bolt 103 extends through slot 102d and is surrounded by a bushing 104 in said slot. Bolt 103 extends through the members or plates 98. The upper end of portion 102c is disposed between the arms at the lower end of member 106 and connected to the same by the transversely extending bolt 105. With the construction just described, the position of the motor relative to the member 15k will be determined by the engagement of the slot 98a with bolt 97. Member 106 is connected to member 102 so that said member will always be the same distance from member 91. A member 108 is provided which is bored to receive and be slidable on the driveshaft casing 15*j* and said member has an enlargement at its lower end provided with a bore 108*a* larger than the driveshaft casing 15*j* to provide a depending flange 108*b*. The bore 108*a* is sufficiently large to receive the portion 102*a* and portion 102*a* would then be enclosed by flange 108*b*. Member 108 has secured thereto a flexible wire 109 which is secured by a suitable screw 110 to the member 108. Wire 109 passes through a tube 112 secured to the casing 15*b* by a clamp 113. Clamp 113 is secured by a screw 116. Tube 112 extends to adjacent the path of an arm 114 which is secured to shaft 70. Wire 109 is secured in a swiveling stud 115 secured in the outer end of arm 114.

In operation the motor will be started as usual. Assuming that the motor is started with the driving mechanism in neutral position, clutch member 32 will occupy the position shown in Fig. 5 and the teeth thereon will not be in engagement with either of the gears 24 or 28. The motor at this time will be running at comparatively low speed. It will be noted that with the driving mechanism in neutral position, beveled gear 22 which will be driven will rotate gears 24 and 28 since they are all constantly in mesh. Gear 24 will rotate on the needle bearings 26 and gear 28 will rotate on the bushing 29. If it is desired to place the driving mechanism in the forward position, the operator will swing lever 72 to the right, as shown in Fig. 9. This will swing shaft 70 and arm 68 so that the wire 67 will be pulled upwardly. This will move rod 59 and members 56 and 55 upwardly. The lower end of rod 55 will move upwardly out of alinement and out of engagement with the beveled end of rod or shaft 50 and this shaft will then be moved to the left, as seen in Fig. 5, by spring 49. Clutch member 32 is thus moved into engagement with the clutch 30 secured to beveled gear 28 and beveled gear 28 will then rotate propeller shaft 25 and the propeller 40 in a direction to move the boat forwardly. It will be noted that the clutch 32 is held in engagement by the spring 49. With the propeller shaft being driven, it will be noted that it will rotate in the bearings 43 and 44. Gear 24 will run on needle bearings 26.

To again place the driving mechanism in neutral, lever 72 will be moved to its central position, as shown in Fig. 9, and member 55 will be moved to the position shown in Fig. 5, thus moving rod or shaft 50 and moving clutch 32 to the non-engaging position shown in Fig. 5. If it is desired to place the driving mechanism in reverse position, lever 72 will be swung to the left, as shown in Figs. 9 and 10, and to the position shown in Fig. 10. Arm 68 will thus be oscillated and wire 67 will be moved downwardly, thus moving rod 59 and members 56 and 55 downwardly. Rod 55 will be moved downwardly from the position shown in Fig. 5 so that the portion just above portion 55*b* which is substantially vertical will be moved against the end of shaft or rod 50 so that the latter will be moved to the right, as shown in Fig. 5, against the compression of spring 49, and clutch member 32 will be brought into engagement with the clutch member 30 secured to gear 24. The propeller shaft will thus be driven through pin 46 in the opposite direction to that in which it moves in the forward position above described. When the member 55 is in neutral position it is yieldingly held in this position by the plunger 75 which engages the recess 55*c* due to the action of spring 76. When member 55 is raised or lowered, plunger 75 is cammed out of recess 55*c*. The inclination is given to clutch teeth surfaces 32C and 30*a* so that the spring 49 can easily move the clutch member 32 out of engagement with the clutch member 30.

It is desirable to prevent shifting of the driving mechanism and specifically of clutch member 32 unless the motor is running at reduced speed. As described the lever 89 is used to advance or retard the spark on the motor and the speed is decreased if said lever is moved upwardly, as shown in Fig. 8. Valve 138 is also thus moved toward closed position to decrease the supply of fuel which also reduces the speed. When lever 72 is moved, it swings arm 78 and through the link 79 moves the rod 83 vertically. When the driving mechanism is in forward position the motor can operate at high speed and lever 89 will then be moved downwardly, as shown in Fig. 8, and the plate 89*a* will be disposed over the top of rod 83, as shown in Figs. 1 and 2. Should the operator now try to swing lever 72 to shift the driving mechanism into neutral, arm 78 would swing upwardly and rod 83 would tend to move upwardly. Rod 83 however would strike plate 89*a* and it would be impossible to move lever 72 any appreciable distance so that member 55 could not be moved downwardly. Before the operator can shift out of forward, he must move lever 89 to the left or upwardly, as shown in Fig. 8, to move plate 89*a* out of alinement with the upper end of rod 83, and this would reduce the speed of the motor. The speed of the motor is thus reduced to a safe point before it is possible to shift the driving mechanism from forward to neutral. When the driving mechanism is in neutral, rod 83 has been raised and the upper portion thereof or portion 83*a* is in alinement with the edge of plate 89*a*, or in other words, said upper portion 83*a* and plate 89*a* are in the same plane, as shown in Fig. 3. At this time the reduced portion 83*a* is in alinement with, or in the same plane as plate 89*a*. If the operator now swings lever 89 counter-clockwise or downwardly, as shown in Fig. 8, the slot 89*b* will embrace portion 83*a*, as shown in Fig. 3. The lever 89 however can only be moved until the end of slot 89*b* engages portion 83*a*. It is thus not possible to materially increase the speed of the motor when the driving mechanism is in neutral. Overspeeding of the unloaded motor is thus prevented. Should the operator wish to shift the driving mechanism from neutral to reverse, or forward position, it will be seen that this cannot be done as long as portion 83*a* is in the slot 89*b*. Plate 89*a* prevents vertical movement of rod 83. It will first be necessary to move lever 89 in a clockwise direction so that the plate 89*a* moves out of engagement with portion 83*a* of rod 83. The motor is now reduced to slow speed and the driving mechanism can be shifted. When the driving mechanism is in reverse position, portion 83*b* of rod 83 is in alinement with or in the same plane as plate 89*a* and portion 83*b* of rod 83 is in alinement with or in the same plane as plate 89*a* and portion 83*b* is embraced by slot 89*b*. The driving mechanism cannot thus be moved out of reverse position until lever 89 is swung to move plate 89*a* out of engagement with portion 83*b* of rod 83 and to thus reduce the speed of the motor. It will also be seen that the motor can only be increased in speed until the end of slot 89*b* engages portion 83*b*. The degree of speed in reverse is thus limited. It is not desirable to operate the motor at high speed with the driving mechanism in reverse because first the motor and boat are not protected by any tilting or swinging movement of casing 15, and secondly to prevent water being thrown over the transom of the boat.

When the motor is operating with the driving mechanism in forward position, the tendency of the propeller is to swing the motor about bolt 94 toward the boat transom 92. As stated, this movement is limited by the pin or bolt 97 being engaged by the slot 98a. When the propeller is operating with the driving mechanism in reverse position, the tendency would be to swing the motor away from the boat transom 92. When lever 72 is moved to shift the driving mechanism into reverse position, arm 114 is moved to the left, as shown in Fig. 10, and wire 109 is moved to the left at its upper end and said wire is moved downwardly in the vertical portion of tube 112. Member 108 is thus moved downwardly. When member 108 is moved downwardly its flange 108b moves over portion 102a of member 102. This locks the motor to member 102 so that the motor cannot swing away from the boat transom. The member 106 is provided to keep member 102 always the same distance from bolt 94 or member 91 so that it will be sure to be engaged properly by member 108. As stated, the pin 97 will be disposed in any one of the holes 15k2 to position the motor variously when the same is operating in forward position. The movement of the spark lever 89 when moved counter-clockwise, as shown in Fig. 13, not only reduces the speed by retarding the speed, but also reduces the speed by throttling the motor as cam 120 engages lever arm 122 and arm 129 is then swung to turn valve 138 to throttle the motor. A very nice movement and adjustment of the movement of valve 138 can be had by adjusting screw 130. This forms no part of the invention claimed in this application. It is thus seen that applicants slow down the speed of the motor by the spark lever and by throttling, and as above described, means is provided to prevent shifting until the motor is running at slow speed.

From the above description it will be seen that we have provided a quite simple and highly efficient reversing mechanism for an outboard motor, together with a simple, efficient and safe control for operating the speed of the motor. The operator has only to move lever 72 to perform the shifting operation and he will be unable to shift the driving mechanism until he has reduced the speed of the motor to a safe point. The parts of the device are designed for efficient production. The device has been amply demonstrated in actual practice, found to be very successful and efficient and is being commercially made.

It will of course be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. An outboard motor having in combination, a driving shaft extending from the motor proper, a propeller shaft extending at an angle to said driving shaft, a beleved gear secured to said driving shaft, oppositely disposed beveled gears carried on said propeller shaft and meshing with said beveled gear at opposite sides thereof, clutch teeth secured to the adjacent ends of said last mentioned beveled gears, a clutch slidable longitudinally on said propeller shaft having teeth at its ends to engage the teeth on either of said last mentioned beveled gears, a member movable in and longitudinally of said propeller shaft secured to said clutch member, resilient means engaging and urging said last mentioned member in one direction, a second member movable substantially parallel to said driving shaft and having a cam portion engaging said second member to move said clutch into engagement with one of said last mentioned beveled gears to rotate said propeller shaft in reverse and to a neutral position against the resistance of said resilient means and movable out of engagement with said first mentioned member to permit said resilient means to move said clutch into engagement with the other of said last mentioned beveled gears to rotate said propeller shaft to give forward motion.

2. The structure set forth in claim 1, said propeller shaft having a bore therein and said first mentioned member fitting in and being disposed in and longitudinally movable in said bore.

3. The structure set forth in claim 1, said second mentioned member having a recess therein and a resiliently actuated member engageable in said recess for holding said member and said clutch member in neutral position.

4. An outboard motor having in combination, a casing, a driving shaft journaled in said casing and extending longitudinally thereof, a propeller shaft at one end of said driving shaft extending at right angles thereto and journaled in said casing, a beveled gear secured to said end of said driving shaft, a pair of beveled gears disposed at opposite sides of said first mentioned beveled gear and meshing therewith, said last mentioned beveled gears having clutch teeth at their adjacent ends, a clutch member slidable longitudinally of said propeller shaft and having teeth at its ends adapted to engage the teeth on either of said last mentioned beveled gears, a member movable longitudinally of said propeller shaft secured to said clutch member, a spring engaging said member and urging the same in one direction, a second member disposed at one side of said driving shaft and having cam portions disposed to separately engage said first mentioned member to move said clutch into engagement with one of said last mentioned beveled gears to rotate said propeller shaft in reverse and to a neutral position respectively against the resistance of said spring and movable out of engagement with said first mentioned member to permit said spring to move said first mentioned member and move said clutch into engagement with the other of said beveled gears to rotate said propeller shaft to give forward motion, and means disposed for convenient manipulation by the operator for moving said second mentioned member whereby said clutch is held positively in position in neutral and reverse and held yieldingly in forward position.

5. The structure set forth in claim 4, said propeller shaft having a bore extending longitudinally and axially therein, said first mentioned member being disposed in and fitting in said bore, said spring being disposed in said bore at one end of said first mentioned member, said casing having a bore therein and said second mentioned member being cylindrical and disposed in and slidable in said last mentioned bore.

6. An outboard motor having in combination, a reversing mechanism shiftable to forward, neutral and reverse positions, means for shifting said mechanism, means for adjusting the spark of said motor to vary the speed thereof and a member preventing the operation of said first mentioned means until said spark-adjusting means is in a position giving slow speed to said motor.

7. An outboard motor structure having in combination, a reversing mechanism shiftable to forward, neutral and reverse positions, a member movable to shift said mechanism, a second member connected and movable to different positions by said member, means including a movable handle for adjusting the spark of said motor to vary the speed thereof, and means movable with said handle movable into the path of movement of said second mentioned member to prevent movement thereof and shifting of said mechanism until said first mentioned means and handle are in a position giving slow speed to said motor.

8. An outboard motor structure having in combination, a reversing mechanism shiftable to forward, neutral and reverse positions, a member movable to shift said mechanism, a lever for operating said member, means for adjusting the spark in said motor to vary the speed thereof including a handle, a member movable with said handle having a slot therein, a rod movable by said lever into the plane of said last mentioned member having reduced portions embraced by said slot when said lever and rod are in positions with said mechanism in neutral or reverse position whereby said lever and rod are held from movement by said last mentioned member until said first mentioned means and handle are moved out of alinement with said rod and into a position giving slow speed to said motor.

9. An outboard motor structure having in combination, a driving mechanism shiftable to forward, neutral and reverse positions, a lever for shifting said mechanism, means for adjusting the spark in said motor to vary the speed thereof including a handle, a plate movable by said handle having an open ended slot therein, a rod vertically movable by movement of said lever and having portions disposed in the plane of said plate and receivable in said slot when said mechanism is in neutral or reverse position respectively, said rod having stops adjacent said portions preventing movement of said rod and lever when said portions are in said slot whereby said first mentioned means and handle must be moved to move said plate and slot away from said portions and to positions producing slow speed of said motor before said lever can be moved and said driving mechanism shifted.

10. The structure set forth in claim 9, said plate being movable to a position over said rod when said motor is operating at high speed and said driving mechanism is in forward position whereby said rod will strike the bottom of said plate if said lever is moved to shift said driving mechanism out of forward position so that such movement of said lever is prevented.

11. An outboard motor structure having in combination, a member adapted to be clamped to a boat transom, a motor casing including a shaft housing pivoted to said member for swinging movement about a substantially horizontal axis, a pivot about which said casing swings, a sleeve member slidable on said shaft housing, a second member embracing said shaft housing below said sleeve, a driving mechanism for said motor shiftable to forward, neutral and reverse positions, means for shifting said driving mechanism, and means connected to said last mentioned means and moved thereby when said mechanism is shifted to reverse position to move said sleeve into engagement with said second member to prevent said casing from swinging away from said first mentioned member and boat transom and a rigid link pivoted on said pivot and connected to said second member for automatically retaining said second member a fixed distance from said axis.

12. An outboard motor structure having in combination, a member adapted to be clamped to a boat transom, a motor and casing including a driving shaft connected to said member about a substantially horizontal pivot for swinging movement away from and toward said boat transom, a pin disposable in different positions in said first mentioned member for determining the position of said casing relative to said member when said driving mechanism is in forward position, a second member pivoted to said first mentioned member and having an elongated slot therein through which said pin passes, a sleeve movable vertically about said shaft, a third member adjacent said shaft below said sleeve, and a link pivotally connected to said third member and to said pivot member.

13. An outboard motor structure having in combination, a driving mechanism shiftable to forward, neutral and reverse positions, a lever for shifting said mechanism, a member movable to different positions by said lever, means for adjusting the spark of said motor and for varying the speed thereof and a second member carried by said means and movable in a plane intersected by the path of movement of said first mentioned member and acting to prevent movement of said first mentioned member and thus to prevent shifting movement of said lever except when said means is in a position producing slow speed.

14. An outboard motor having in combination, a casing, a driving shaft journalled in said casing, a propeller shaft, a reversing mechanism associated with said shafts, a member extending upwardly in said casing and movable to different positions for placing said mechanism in forward, neutral and reverse positions respectively, a lever adjacent the upper part of said casing for moving said member, a second member movable for varying the speed of said motor by adjusting the spark or timing thereof, a third member movable vertically by said lever when moved for moving said first mentioned member, a fourth member carried by said second member for engaging said third member and preventing movement of said lever, third member and first mentioned member until said second member is in position giving a low speed to said motor.

15. An outboard motor structure having in combination, a casing, means pivotally connected to said casing about a substantially horizontal axis and adapted to be clamped to a boat whereby said casing below said means may swing upwardly and away from said boat, a driving mechanism for said motor including a driving shaft and a shift mechanism for placing said driving mechanism in forward, neutral or reverse position, a lever for operating said shift mechanism, a housing for said driving shaft, a member partially embracing and abutting said housing and carried by said casing, a sleeve surrounding said housing and having a lower portion arranged to move over said member, means connecting said lever and sleeve so that when said lever is moved to place said shift mechanism in reverse position said sleeve will be moved over the upper portion of said member and prevent said casing from being swung upwardly regardless of the position of said casing and first mentioned means, a link pivotally connected at one end to said member and swingable at its other end about said axis so that said member is always maintained at a fixed vertical distance from said axis so as to be in position to have said sleeve moved thereover when said shift mechanism is placed in reverse position.

DANIEL A. ARMSTRONG.
    BYRON CARLSON.
    CARL A. WALZ.

References Cited in the file of this patent

UNITED STATES PATENTS

| Number | Name | Date |
|---|---|---|
| 345,670 | Campbell | July 20, 1886 |
| 1,181,634 | Bivert | May 2, 1916 |
| 1,308,707 | Gross | July 1, 1919 |
| 1,483,883 | Hillhouse | Feb. 19, 1924 |
| 1,683,893 | Irgens | Sept. 11, 1928 |
| 1,910,561 | Pierce | May 23, 1933 |
| 1,933,481 | Mathias | Oct. 31, 1933 |
| 2,070,406 | Irgens | Feb. 9, 1937 |
| 2,071,634 | Irgens | Feb. 23, 1937 |
| 2,082,058 | Irgens | June 1, 1937 |